May 27, 1947.  M. H. BAKER ET AL  2,421,178

CLAMP

Filed Dec. 9, 1944

INVENTORS
MORTON H. BAKER
JOHN F. BLACKBURN
BY
Attorney

Patented May 27, 1947

2,421,178

UNITED STATES PATENT OFFICE 2,421,178

CLAMP

Morton H. Baker, Brookline, and John F. Blackburn, Cambridge, Mass., assignors, by mesne assignments, to United States of America, as represented by the Secretary of War Application December 9, 1944, Serial No. 567,514

2 Claims. (Cl. 285—171)

The present invention relates to a clamp or retaining device for securely and detachably connecting two lengths of transmission line.

In certain apparatus it has been found necessary to frequently connect and disconnect a transmission line used to transmit high frequency energy to and from a variable position apparatus where the length and position of the line is relatively fixed. It is therefore an object of the present invention to provide a device for readily connecting or disconnecting two lengths of transmission line without the necessity of moving or bending the lines.

It is also an object of the invention to provide a clamping device which may be easily set, readily releasable and used to quickly secure two pipes together without the necessity of threaded engagement.

It is another object of the invention to provide a clamping device which, when in clamping position, is not susceptible to release or disengagement by ordinary shock.

Further objects and advantages of the invention will become readily apparent as the description proceeds, reference being had to the accompanying drawings, in which—

Figure 1:
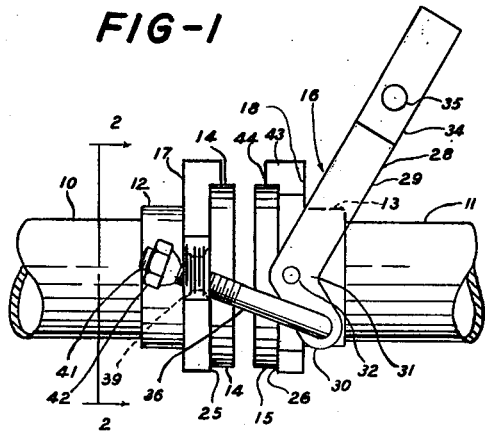
Fig. 1 is a side elevation view of one embodiment of the device, according to the present invention, shown in non-clamping position relative to two pipe ends.

A hollow pipe or coaxial cable 10 has a sleeve 12 with an outwardly extending flange 14 mounted on the end of the pipe 10 in any suitable manner. A similar sleeve 13, with an outwardly extending flange 15, is mounted in any suitable manner upon the end of another pipe 11. The ends of pipe 10 and 11 are adapted to be connected together. They may, of course, be provided with integral flanges 14 and 15 at their ends instead of the flanged sleeves.

It will be understood that the term "pipe" as used in this description and the appended claims refers to any form of transmission line, two lengths of which are to be connected, such as coaxial cable, hollow pipe transmission guide, solid conductors in the form of rods or cables, or even fluid-conducting pipes, which are formed with or carry an outstanding flange at their ends.

With reference to Figs. 1 to 4, one embodiment of the clamp of the present invention is generally indicated at 16 and comprises two substantially horseshoe- or U-shaped members 17 and 18 of metal or any other mechanically suitable rigid material. The members 17 and 18 are normally disposed with their major planes substantially parallel with each other, and perpendicular to the axes of the pipes and with the U-shaped recesses opening in the same direction. The inside surface of each U-shaped member 17 and 18 is formed by substantially straight leg portions 19 and 20 (Fig. 2) joined preferably by a curved wall portion 21, the radius of which is slightly larger than that of the pipe or of the sleeves on the pipe ends for which the clamp is to be used. The outside surface of member 18 has leg portions 22 and 23 (Fig. 4) substantially parallel to surfaces 19 and 20, respectively, and which are joined by a curved or flat surface 24, or a surface of any desired shape such as that shown in Fig. 4 to form a base portion. The pipes 10 and 11 are adapted to be received in the U-shaped recesses of members 17 and 18 by sliding the pipe ends between the leg portions 19 and 20 so that the opposing faces 25 and 26 of members 17 and 18 abut against the pipe side of the flanges 15 and 16, respectively, and the inside surfaces partially surround the pipe sleeves 12 and 13 when the sleeves are provided.

Pivotally mounted on the outside leg portions 22 and 23 of member 18 are a pair of substantially L-shaped members 27 and 28 of metal or other suitable rigid material. Members 27 and 28 are so disposed that their planes are parallel with the surfaces of portions 22 and 23, respectively. The members 27 and 28 may be rectangular in cross-section and have their wider surfaces in planes normal to the plane of member 18. Each of said L-shaped members 27 and 28 has a long leg portion 29 and a short leg portion 30 preferably at an obtuse angle relative to the long leg portion 29 (Fig. 1). Members 27 and 28 are pivotally connected at their apex regions 31 to the outer surface portions 22 and 23 of member 18 thereby forming a pair of parallel bell-cranks adapted to rotate in planes perpendicular to the plane of face 26 of member 18. The pivot connection may be by any suitable means such as a rivet or lug 32, through apertures or bearings in the sidewall portions 22 and 23 of member 18 and the apex region 31 of each bell-crank.

Figure 2:
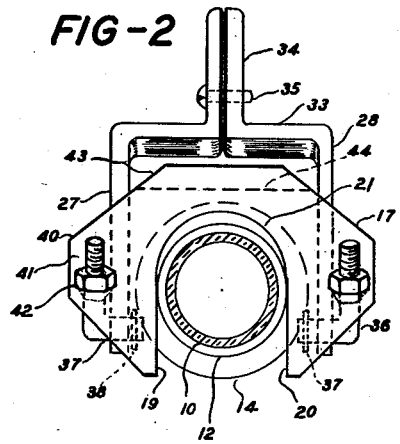
Fig. 2 is an elevation view of the device looking from the left (along the line 2—2) of Fig. 1.
Figure 4:
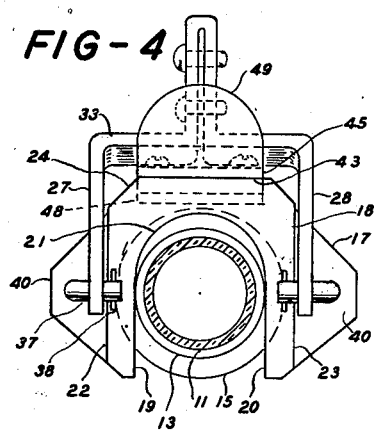
Fig. 4 is an elevation view of the device looking from the right (along the line 4—4) of Fig. 3.

The upper ends of legs 29 of bell-cranks 27 and 28 are bent, preferably at right angles, towards each other, and may be joined to complete a substantially inverted U-shaped member 33. If desired, legs 29 may be bent towards each other and then bent again substantially at right angles so that they are adjacent and parallel to each other to form a projecting handle portion 34 as best shown in Fig. 2. The two parts of handle portion 34 may be secured together by any suitable means such as by welding or brazing, or by means of one or more rivets as indicated at 35. As shown in Fig. 4, handle portion 34 and bell-crank portions 27 and 28 may be formed in one piece and held in shape by being suitably secured together by rivets 35, or by welding, brazing, etc.

One end of each of a pair of substantially parallel rods 36 is pivotally connected near the end of each short-leg portion 30 of each bell-crank 27 and 28. Each rod 36 is bent near its end substantially at a right angle and the short end portion 37 extends through an aperture in the leg portion 30 whereby the rod 36 will be adapted to rotate relative to the bell-crank. The short end portion 37 is prevented from disengaging from the bell-crank by any suitable means such as by cotter pins or rivets 38 through the end portion 37 perpendicular to its axis, or by flattening, spreading, or upsetting the end portion 37.

The opposite end of each rod 36 is adapted to extend through, and loosely engage in, apertures 39 provided in laterally extending portions 40 of member 17. The end portions of rods 36 are threaded as at 41 for engagement with nuts 42 which may thereby be positioned along the length of rods 36 to adjust the effective length of rods 36 and thereby the distance between members 17 and 18. The distance thereby may be adjusted according to the dimensions of the flanges 14 and 15 and the distances between the flanges 14 and 15 so that when the clamp 16 is in clamping position the opposing faces of flanges 14 and 15 will abut.

Figure 3:
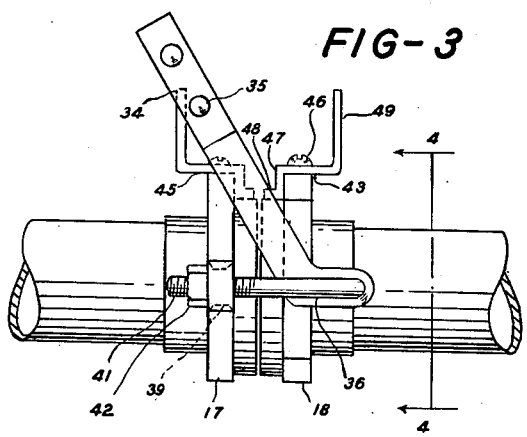
Fig. 3 is a side elevation view similar to Fig. 1, showing the device in clamping position and also showing a modification thereof.

As shown in Fig. 1 the flange-engaging surfaces 25 and 26 of members 17 and 18 may be provided at their base portions 43 with outstanding flange portions 44 adapted to engage the peripheral surface of the flanges 14 and 15 to insure that the pipes are mutually centered when clamped together. Another form of centering means is shown in Fig. 3 wherein a bracket 45 of sheet metal or other suitably rigid material is disposed along the outer surface of the base portions 43 of members 17 and 18 and is secured thereto by any suitable means such as welding or by screws 46. A depending portion 47 of bracket 45 terminates in an outstanding flange 48 for engagement with the peripheral surface of the pipe flanges 14 and 15. The bracket 45 may also be provided with an upstanding flange member 49 to serve as a brace portion to provide leverage for manipulation of the handle 34. Brace portion 49 may be of any suitable shape, but conveniently may be in the form of a semi-circular member as shown more clearly in Fig. 4.

In use, the clamp of the present invention is slipped on the adjacent ends of the pipes to be connected so that the ends of the pipe are received in the U-shaped recesses of members 17 and 18 with surfaces 25 and 26 of members 17 and 18 respectively abutting the pipe side of the spaced pipe flanges 14 and 15, and with the bell-cranks 27 and 28 in the position shown in Fig. 1.

The bell-cranks 27 and 28 are then rotated in a counterclockwise direction by manipulation of the handle 34 to the position shown in Fig. 3 whereby the lever action of the parallel bell-cranks 27 and 28 on the rods 35 effectively and positively moves the members 17 and 18 toward each other thereby connecting the two lengths of pipe.

Figure 5:
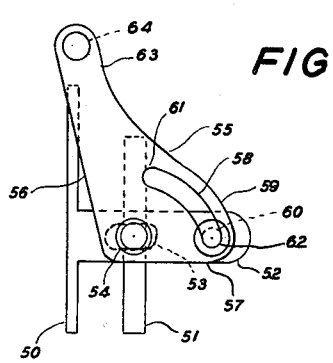
Fig. 5 is a side elevation view of a modification of the device according to the present invention showing the same in clamping position but with the pipes omitted.
Figure 6:
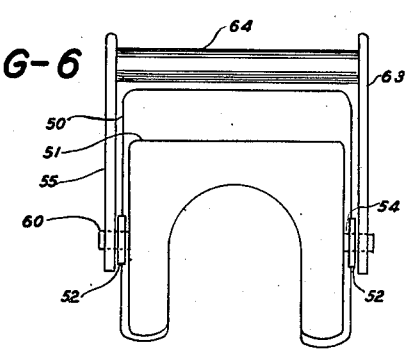
Fig. 6 is a front elevation view of the device shown in Fig. 5.

A modification of the clamp according to the present invention is shown in Figs. 5 and 6. A pair of substantially horseshoe or U-shaped members 50 and 51 are adapted to slide over the adjacent ends of two pipes with their substantially parallel opposing faces engaging the pipe side of flanges on the pipe ends in a manner similar to that described with reference to Figs. 1 to 4.

A pair of arms 52 are disposed perpendicularly to the plane of member 50 and each arm is rigidly secured at one of its ends to member 50, or if desired the arms 52 may be integral lateral extensions of member 50 and bent at right angles thereto. The center portion of each arm 52 is provided with a slot 53 having its longitudinal axis substantially colinear with the longitudinal axis of the arm 52. Member 51 is provided with a laterally-projecting shaft or lug 54 (which may be integral with member 51) extending through and beyond each of the slots 53 whereby member 51 is adapted to be slidably and pivotally mounted in the slots 53.

Pivotally mounted on the extending end portion of each lug 54, is a plane member 55 of sheet metal or any other suitable material having its plane parallel with the plane of arm 52 and perpendicular to the planes of members 50 and 51. Member 55 is generally in the form of a bell-crank having a substantially L-shaped edge portion consisting of long-leg portion 56 and a short-leg portion 57 which is substantially parallel with the lower edge of arm 52 when in the clamped position as shown in Fig. 5. The apex region of leg portions 56 and 57 is provided with an aperture for receiving the end of lug 54 whereby member 55 is adapted to rotate about lug 54 relative to arm 52 and member 51. The end of bearing 54 may be upset, flattened, or otherwise suitably terminated to prevent displacement of bell-crank member 55.

An arcuate slot 58 is provided in an enlarged portion 59 of member 55 for receiving a lug or bearing 60 rigidly secured near the end of arm 52, the lower end of the slot 58 being substantially in line with the bearing 54 when the member 55 is in the position shown in Fig. 5. Lug or bearing 60 may be in the form of a rivet or an integral lug extending outwardly from arm 52 through, and in slidable association with, slot 58. Slot 58 is so shaped that its radius from bearing 54 is smaller at the upper end 61 of slot 58 than at the other or lower end 62. Thus the walls of slot 58 define a cam surface for bearing or lug 60 upon pivotal movement of bell-crank member 55. The upper or small end portions 63 of members 55 are joined together by a handle portion 64 which may be of any desirable shape such as in the form of a bar rigidly secured to portions 63 or formed as an integral part of members 55.

The manner of applying the clamp illustrated in Figs. 5 and 6 is similar to that described with reference to Figs. 1 to 4. The members 50 and 51 are slipped over adjacent pipe ends or sleeves thereon with their opposing faces engaging the pipe side of the pipe flanges, the member 55 being in the position whereby the lug 60 is engaged in the upper end 61 of slot 58. A counterclockwise rotation of member 55 by means of hand pressure on handle 64 causes a camming action between the lug 60 and slot 58 resulting in a longitudinal movement of member 55 relative to arms 52 and toward member 50. This movement of member 55 causes the bearing 54 to move in the same direction in slot 53 which imparts like movement to member 51 toward member 50, thus effectively and positively connecting and clamping the ends of the pipe together.

It will be noted that the movement of the bellcranks 27 and 28 from the position of Fig. 1 to that of Fig. 3 and the similar movement of bellcrank members 55 as described with reference to Figs. 5 and 6 has an "over center" effect which produces a fixed clamping position. When the bell-cranks 27, 28 and 55 pass "over center" the clamp will thereafter maintain itself in clamping position until positively released and is not susceptible to release by ordinary shock. When it is desired to disconnect the pipes a small positive motion of the handle 34 or 64 in a clockwise direction will release the clamp and permit it to be easily disengaged from the pipes.

While preferred embodiments of the present invention have been illustrated and described, it will be understood these are capable of modification and improvement without departing from the spirit of the invention. Therefore it is not desired that the scope of the invention be limited to the precise details set forth.

What is claimed is:

1. A clamping device for connecting two lengths of pipe having outstanding flanges on the adjacent ends thereof comprising, in combination, a pair of substantially parallel U-shaped members adapted to receive pipe ends within the U-shaped recesses thereof, the opposing faces of said members being adapted to engage the pipe side of said flanges, a pair of arms extending from the side walls of one of said members in planes normal to the plane of the flange-engaging face of said member, a slot disposed longitudinally and centrally in each said arm, the other of said members having projecting pivot members rotatably and slidably mounted in said slots, a pair of parallel rotatable members pivotally mounted on the ends of said pivot members projecting beyond said slots, an arcuate slot in each said rotatable member, said slot having a greater radius at one end than at the other end providing a camming surface in each said rotatable member, a lug extending outwardly from the end portion of each of said arms and engaging said camming surface of said arcuate slot, and a handle member rigidly associated with and connecting said rotatable members, whereby movement of said handle member rotates said rotatable members and moves said camming surfaces relative to said lugs thereby moving said rotatable members longitudinally relative to said arms while being rotated and thereby imparting movement to said second member to and from said first member.

2. A clamping device for connecting two lengths of pipe having outstanding flanges on the adjacent ends thereof comprising a pair of flange engaging members having substantially U-shaped recesses therein, said members being adapted to receive pipe ends within the U-shaped recesses and to engage the flanges thereon, a pair of arms extending from opposite sides of one of said flange engaging members, a slot disposed longitudinally and centrally in each arm, the other of said flange engaging members having pivot members extending from opposite sides thereof and slidably mounted in said slots, a pair of rotatable members pivotally mounted on said pivot members, an arcuate slot in each rotatable member, said slot having a greater radius at one end than at the other end to provide a camming surface in said rotatable member, a lug extending outwardly from the end portion of each of said arms and engaging the camming surface of the arcuate slot in the adjacent rotatable member, and a handle means rigidly associated with and actuating said rotatable members whereby movement of said handle means rotates said rotatable members and moves said camming surfaces relative to said lugs, thereby moving said pivot members longitudinally relative to said arms to thereby effect relative movement between said flange engaging members.

MORTON H. BAKER.
JOHN F. BLACKBURN.

REFERENCES CITED

The following references are of record in the file of this patent:

UNITED STATES PATENTS

| Number | Name | Date |
| --- | --- | --- |
| 2,133,558 | Miller | Oct. 18, 1939 |